United States Patent
Chen et al.

(10) Patent No.: US 6,975,486 B2
(45) Date of Patent: Dec. 13, 2005

(54) THIN FILM WRITE HEAD HAVING A LAMINATED, FLAT TOP POLE WITH BOTTOM SHAPER AND METHOD OF FABRICATION

(75) Inventors: Yingjian Chen, Fremont, CA (US); Xiaozhong Dang, Fremont, CA (US); Mohamad T. Krounbi, San Jose, CA (US); George V. Kelley, Santa Barbara, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 303 days.

(21) Appl. No.: 10/213,339

(22) Filed: Aug. 6, 2002

(65) Prior Publication Data

US 2004/0027716 A1 Feb. 12, 2004

(51) Int. Cl.[7] .............................................. G11B 5/147
(52) U.S. Cl. ....................................................... 360/126
(58) Field of Search ................................ 360/126, 125, 360/123, 121, 317

(56) References Cited

U.S. PATENT DOCUMENTS

| | | | |
|---|---|---|---|
| 6,043,959 A | * | 3/2000 | Crue et al. .................. 360/317 |
| 6,233,116 B1 | | 5/2001 | Chen et al. |
| 6,317,290 B1 | | 11/2001 | Wang et al. |
| 6,333,830 B2 | | 12/2001 | Rose et al. |
| 6,353,511 B1 | | 3/2002 | Shi et al. |
| 6,410,170 B1 | | 6/2002 | Chen et al. |

* cited by examiner

Primary Examiner—Allen Cao
(74) Attorney, Agent, or Firm—Joshua C. Harrison; Hogan & Hartson LLC

(57) ABSTRACT

A writer for high frequency, data storage heads. The writer includes a first magnetic pole upon which a write gap pedestal is formed with an upper pedestal layer of high moment material with a planar upper surface. An electrical coil is formed on the first magnetic pole. A write gap layer is deposited on the upper surface of the upper pedestal layer. The writer includes a second magnetic pole disposed above the first magnetic pole with a magnetic, flat, top pole layer. The second magnetic pole includes a bottom shaper fabricated from high moment material positioned between the coil and the top pole layer. An insulation insert separates the bottom shaper from the upper pedestal layer. The second magnetic pole includes a thin dielectric lamination layer that separates the top pole layer from the bottom shaper to disrupt the path of eddy current in the second magnetic pole.

30 Claims, 6 Drawing Sheets

THIN FILM WRITE HEAD HAVING A LAMINATED, FLAT TOP POLE WITH BOTTOM SHAPER AND METHOD OF FABRICATION

BACKGROUND OF THE INVENTION

1. Field of the Invention

The present invention relates generally to the field of magnetic read/write heads and magnetic data storage, and more particularly, to a thin film writer, and method of fabricating the same, for use in inductive read/write heads that utilizes a laminated flat top pole having a bottom shaper to control eddy currents and inefficiencies in high frequency applications.

2. Relevant Background

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information.

Data density is determined by the amount of data stored on an area of magnetic media and depends on how much area must be allocated to each bit. Data on magnetic media is often stored in a line or track. Magnetic media often have multiple tracks. In the case of disks, the tracks are nested annular rings with more bits per track and more tracks per disk increasing data density. Data density or a real density, therefore, is determined by both the bit length and by the width of the bit. To decrease bit size, head size is decreased by fabricating thin film read and write heads.

Thin film write heads are typically formed by depositing and etching layers of magnetic, non-magnetic, dielectric, and electrically conductive materials to form the structures of the head, such as a core, a conductor winding, and upper and lower pole tips and yokes. Write heads typically do not contact the magnetic media but instead are separated from the magnetic media by a layer of air or air bearing. Magnetic flux generated between poles of the write head, e.g., on an air bearing surface (ABS), acts across the air bearing to change the magnetic moment of an area on the magnetic media.

Recently, the growth rate of a real density in hard disk drives has been over fifty percent per year. There are significant design and material processing challenges involved in reducing the size of writing heads to conform to the higher track and bit densities that have enabled a real density to grow so rapidly. Because output signal declines proportionally with reductions in track width, new materials with greater sensitivity to magnetic fields need to be developed.

In order for high moment material to be useful for write head applications, several requirements have to be met. The material must be magnetically soft with low coercivity value, and it also must have high permeability and low magnetostriction. As ever smaller structures must handle higher magnetic flux, the write head structures, and in particular the top pole or yoke and pole tips, become susceptible to saturation. As a result, it is necessary to form the pole structures of material with a sufficiently high magnetic moment to handle high flux density without saturating.

The rate or frequency that data is stored to the media is an important measure of the operational performance of the write head. One problem with operating at higher frequency is that the permeability of the material diminishes. As the magnetic flux changes, it generates a corresponding electrical field encircling the magnetic flux opposing the change. In an electrically conducting material, the induced electrical field generates current, referred to as eddy current, which in turn generates an opposing magnetic field. This not only limits flux switching time, but also causes saturation near the edge of the structure, thus lowering the permeability of the structure at high frequency. Laminating the top pole structure or yoke with a non-magnetic insulative material improves high frequency performance over conventional single layer structures. The insulative material reduces eddy currents in the structure, which can be a significant problem in higher frequency write heads. A drawback with this structure is that the non-magnetic laminating layers must be stopped short of the air bearing surface to allow flux to travel toward the write gap within the pole tip.

Hence, there remains a need for a write head or writer, and method of fabricating such as writer, with improved high frequency performance. Preferably, such a writer should address the need for reducing eddy current loss and maintaining flux conducting capability to achieve high writer efficiency while also being configured to support relatively simple fabrication that can be performed with enhanced process control.

SUMMARY OF THE INVENTION

The present invention addresses the above problems by providing a writer for use in write heads and read/write heads that is configured to minimize eddy current loss at very high frequencies while also improving the overall efficiency of the head. Briefly, the writer includes a first magnetic pole upon which a write gap pedestal is formed with an upper pedestal layer of high magnetic moment material with a planar upper surface. An electrically conducting coil is also formed on the first magnetic pole (along with one or more coil insulation elements). A write gap layer is deposited on the upper surface of the upper pedestal layer. The writer further includes a second magnetic pole disposed above the first magnetic pole and having a top pole layer of magnetic material that is formed with a substantially flat upper surface.

To reduce the inefficiencies of the writer, the second magnetic pole includes a bottom shaper fabricated from a thin (e.g., 0.1 to 0.5 micrometers) high moment film positioned between the coil and the top pole layer. An insulation insert separates the bottom shaper from the upper pedestal layer, and the upper surfaces of the insert, the bottom shaper, and the upper pedestal layer are substantially coplanar. To minimize eddy current loss in the writer while still providing a relatively thick second pole, the second magnetic pole also includes a thin dielectric lamination layer that separates the top pole layer from the bottom shaper, which acts to disrupt the path of eddy current in the second magnetic pole. In some embodiments, a second dielectric lamination layer is provided between the first lamination layer and the top pole layer to even further control eddy current loss in the writer.

DETAILED DESCRIPTION OF THE PREFERRED EMBODIMENTS

The present invention is directed toward a writer design, methods of making a writer, and read/write heads and storage systems that incorporate the writer design. The writer design described below utilizes a unique combination of new features and layers (that are configured for simplified fabrication) to achieve enhanced performance for a writer and particularly for high overwrite and servo overwrite, low nonlinear transition shift, minimum pole tip protrusion, and side erasure. The writer design of the invention is also readily extended to extremely narrow track width writers and for writers in which it is beneficial to have a short yoke length.

A significant feature of the writer design is the incorporation of a laminated, flat top pole (i.e., P2) to minimize or control eddy current loss at very high frequencies. The writer includes a pedestal to define zero throat (e.g., a hot seed defined zero throat) and, in one embodiment, the bottom portion or layer of the top pole (i.e., bottom shaper) in one embodiment is coplanar with a top portion or layer of the pedestal. The bottom shaper and coplanar top layer of the pedestal can be fabricated in the same process steps to significantly simplify fabrication of the head. In one embodiment, the bottom shaper is separated from a top portion or layer of the top pole by a thin dielectric lamination layer, which provides the advantage of allowing the writer to efficiently conduct magnetic flux while maintaining low eddy current loss at high frequencies since the thin lamination layer disrupts the eddy current path. The top pole layers are typically fabricated onto a planarized surface such that advanced photolithography can be used to control critical dimensions of the writer. As will be further discussed, some embodiments of the writer include a second dielectric lamination layer between the first lamination layer and the top portion or layer of the top pole to further reduce eddy current. These and other features of the invention and the method of fabrication will become clear from the following description with reference to FIGS. 1–5.

Figure 1:
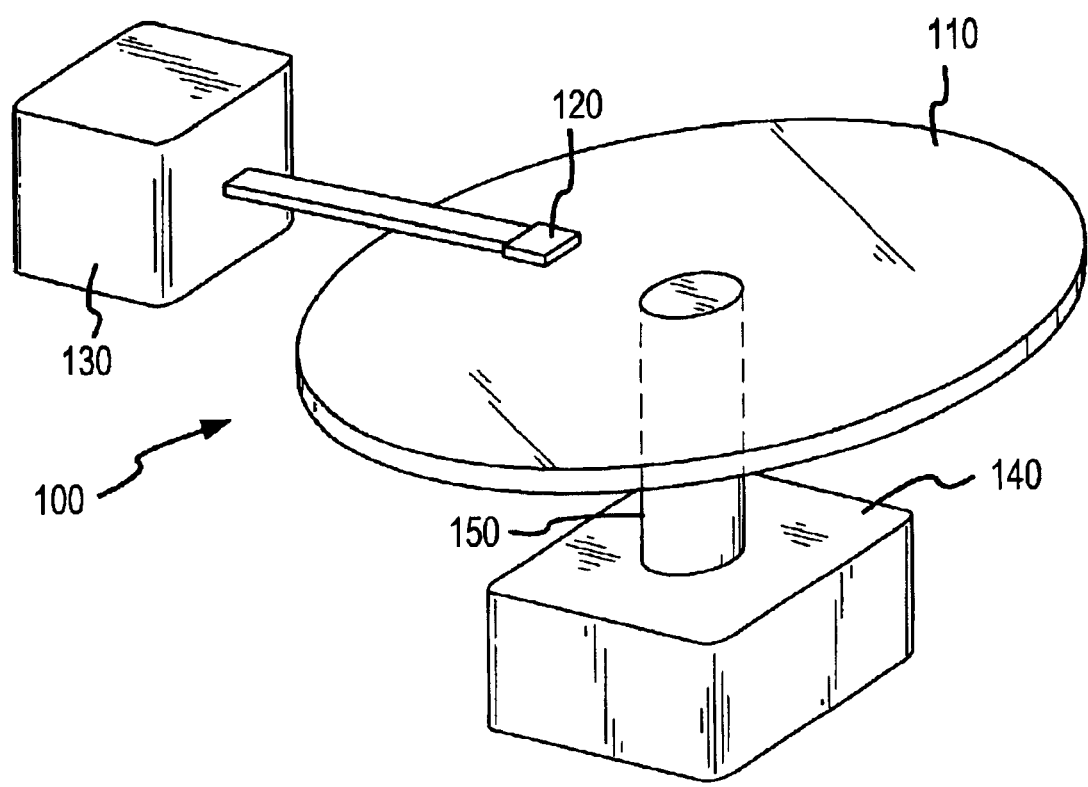
FIG. 1 illustrates a data storage and retrieval apparatus in which the flat top pole write head of the present invention may be implemented.

FIG. 1 shows a typical disk type magnetic data storage and retrieval apparatus 100 in which embodiments of the writer of the invention may be incorporated. The writer or write head of the present invention is located within a merged head assembly 120 that rides above a magnetic storage media 110, depicted in FIG. 1 as a rotatable hard disk type storage media. The hard disk 110 is coupled to a motor 140 via a spindle 150 to provide rotation of the disk 110 relative to the head assembly 120. An actuating device 130 may be used to position the head assembly 120 above the surface of the media 110 to read and write data in the form of magnetic bits from and to the media 110. Of course, the data storage and retrieval apparatus 100 typically has several hard disks 110 and several corresponding head assemblies 120, not shown here for ease of description.

Figure 2:
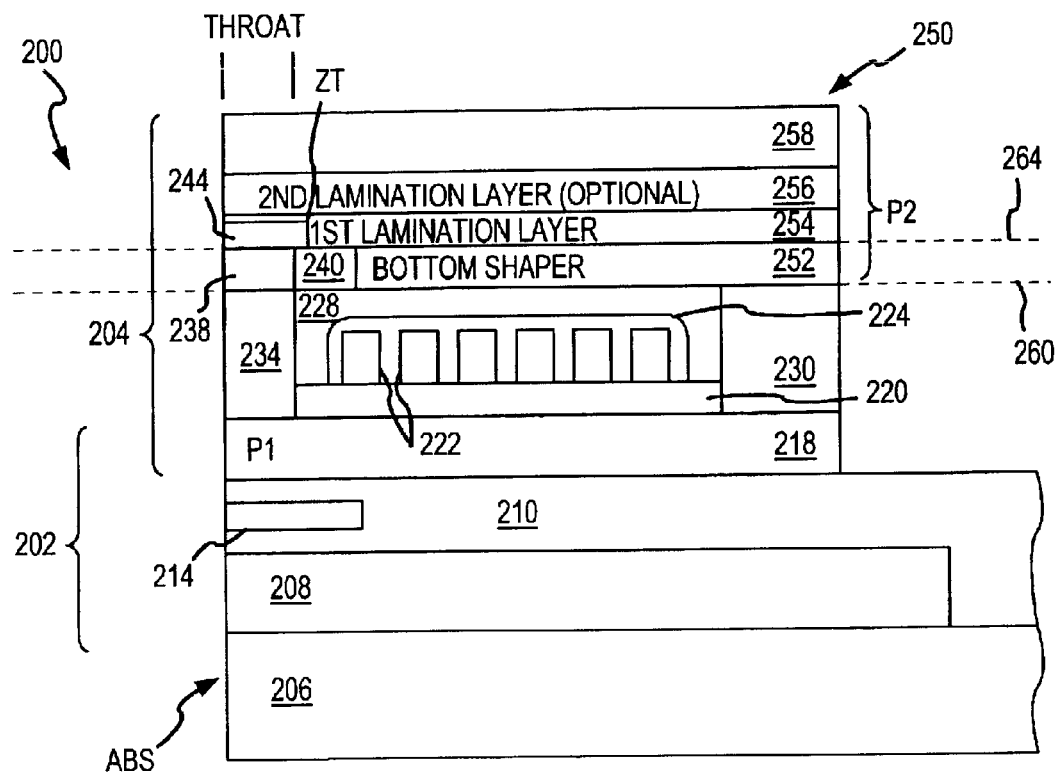
FIG. 2 is a sectional view of a read/write head including a writer or write head according to the present invention having a flat top pole with bottom shaper and one or more lamination layers.
Figure 3:
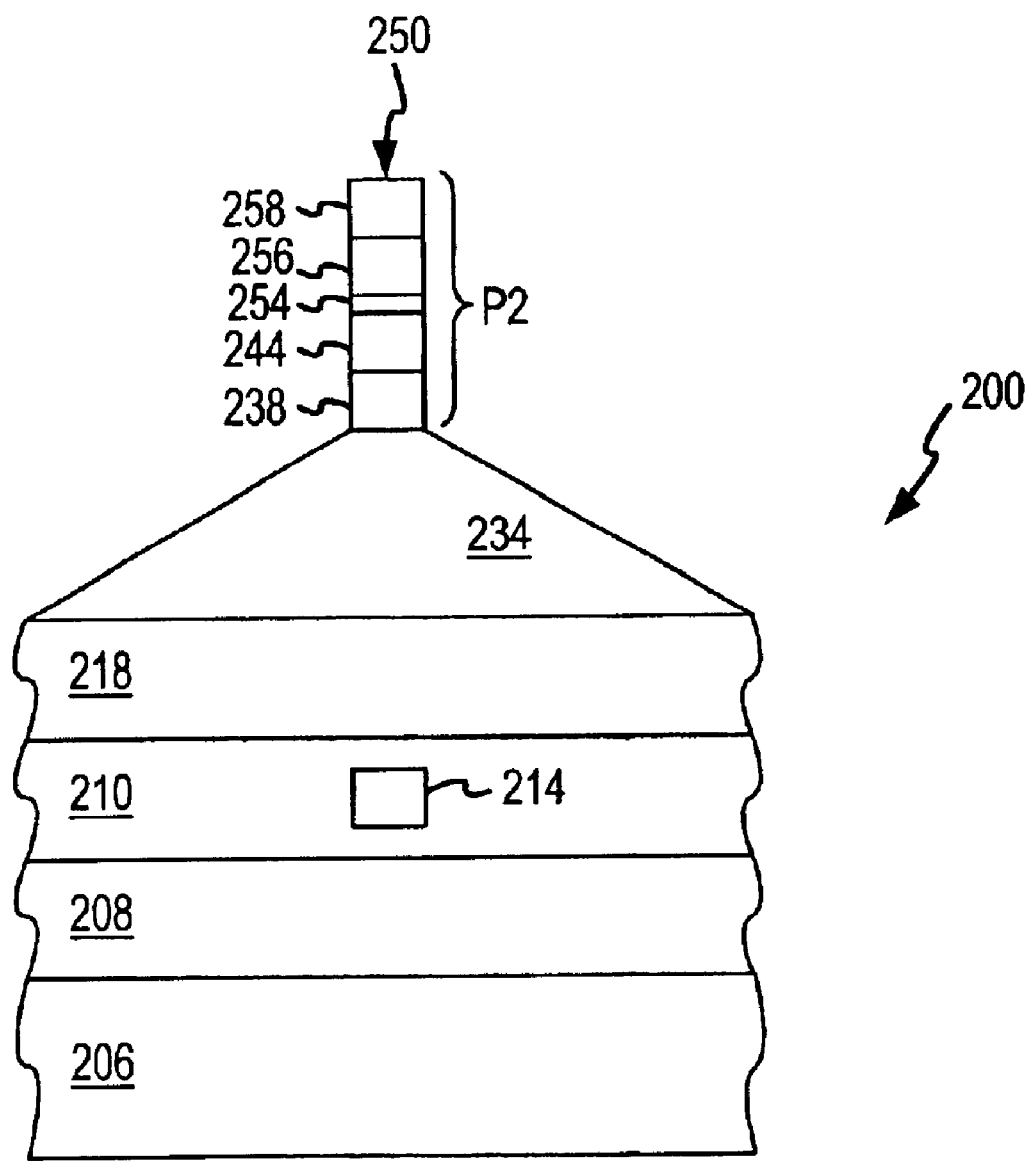
FIG. 3 is an view of the air bearing surface (ABS) of the head of FIG. 2.

With reference to FIGS. 2 and 3, the present invention is shown embodied in a combination read/write head 200 (although the writer design of the invention may be utilized as a standalone device or with other read head designs than the one shown in FIG. 2). The head 200 includes a read portion 202 and a writer 204, all of which is built upon a ceramic substrate 206. The head 200 terminates at an end edge or surface that defines an air bearing surface (ABS) for the head 200.

The read portion 202 includes first and second shields 208 and 218 formed adjacent one another with a layer of dielectric material 210 sandwiched between the shields 208, 218. A read sensor 214 is embedded within the dielectric material layer 210 adjacent the ABS of the head 200. The upper surface of the second shield (i.e., S2 and P1) preferably has a smooth upper surface to facilitate addition of layers and features of the head 200.

The writer 204 includes a first pole 218 (P1 and also S2 for the read portion 202) and a second pole 250 (P2), which define therebetween an interior through which passes a conductive coil 222 that is electrically isolated from the second pole 250 by coil insulation layer 224 and insulation or dielectric layer 228 and from the first pole 218 by insulation or dielectric layer 220. The insulation layers may be any material suitable for providing electrical insulation and magnetic separation such as $Al_2O_3$ and the like. A number of materials may be used for the first pole 218, such as NiFe alloy, CoNiFe alloy, and the like. The coil insulation layer 224 has gently sloping edges due to a curing procedure, as discussed below. The coil 222 is formed on the insulation layer 220 and typically is formed as an electrically conductive planar helix configured such that a portion thereof passes over the first pole 218 between a write gap pedestal 234 and a back gap pedestal 230. While the coil 222 can consist of any suitable electrically conductive material, copper is generally used and plated onto the insulating layer 220.

The writer 204 is a pedestal defined zero throat device and includes a write gap pedestal 234 and a back gap pedestal 230. The pedestals 230, 234 preferably have smooth planar upper surfaces to facilitate fabrication that are coplanar to define a plane 260. While the pedestals can be constructed of any suitable magnetic material, the pedestals 230, 234 are typically constructed from CoNiFe or other NiFe alloy.

Figure 5:
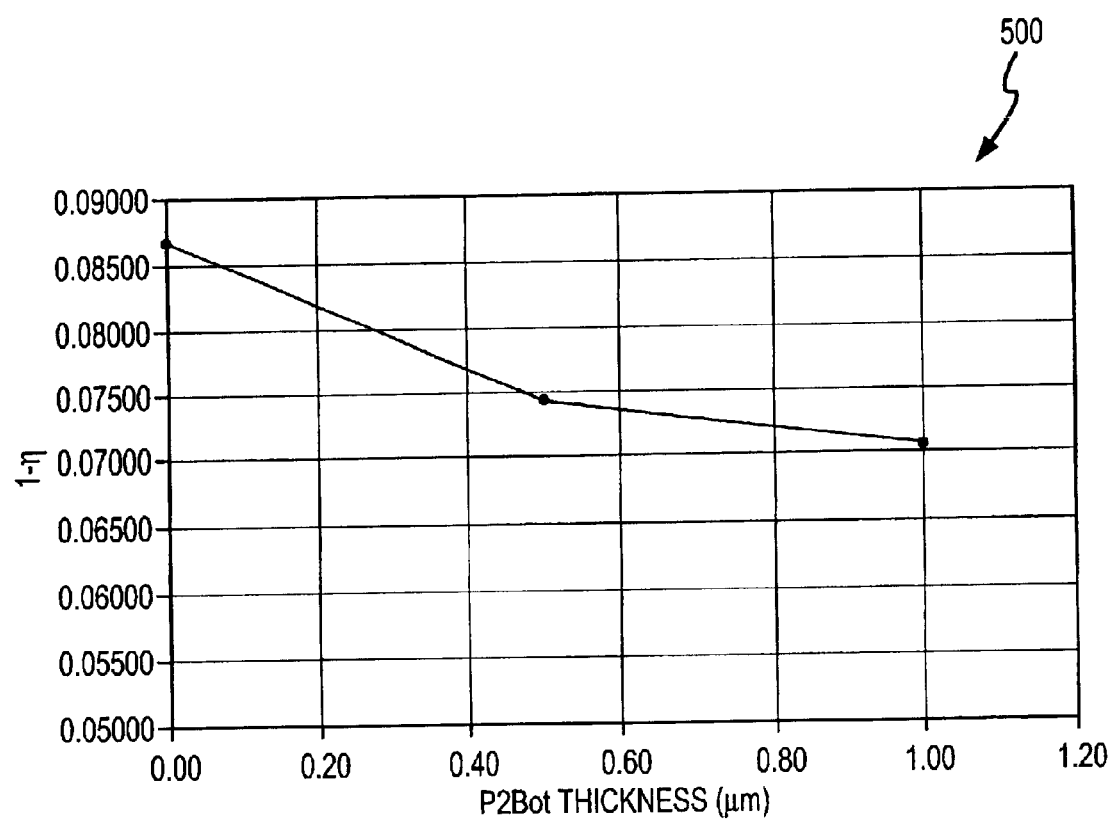
FIG. 5 is a graph illustrating effect of increased bottom shaper thickness on head inefficiencies.

Significantly, a pedestal hot seed or upper layer 238 of high moment material is provided on the write gap pedestal 234. Additionally, the top pole 250 includes a bottom shaper 252 of high moment material or films, such as films having a $B_S$ of 20 to 24 kG or higher. In preferred embodiments, the pedestal upper layer 238 and bottom shaper 252 are fabricated to be coplanar (and have coplanar upper surfaces that define a plane 260) in the same fabrication processes to simplify fabrication (although separate steps may be used) and as such are typically fabricated from the same high moment films (such as sputter deposited films) of FeN, FeCoN, FeCoNi alloys, or FeXN or FeCoXN where X is Rh, Ta, Al, Ir, Zr, or other useful element. The thicknesses of the upper pedestal layer 238 and bottom shaper 252 may vary but have been found to be useful in the range of 0 to 1 micrometers and more preferably 0.1 to 0.5 micrometers. Specifically, FIG. 5 illustrates the effect of increasing thickness of the bottom shaper on reducing the inefficiency (1-efficiency) of a writer. In the illustrated example, the throat thickness was 0.75 micrometers and the thickness of the second pole was 0.75 micrometers. As can be seen, the inclusion of thicker bottom shapers 252 in the head 200 results in a desirable reduction in inefficiency.

Referring again to FIG. 2, the coplanar bottom shaper 252 and upper pedestal layer 238 are separated by an insulation insert 240 (such as Al$_2$O$_3$ or other electrically insulative material). The insert 240 preferably has an upper surface that is coplanar with the upper surfaces of the upper pedestal layer 238 and bottom shaper 252 (and with plane 264). The writer 204 further includes a write gap layer 244 of nonmagnetic or dielectric material, and significantly, the write gap layer 244 is deposited on the write gap pedestal 234 and extends onto or over at least a portion of insert 240 rather than on or under the coil 222.

To control eddy current, the top pole 250 is laminated by including a first lamination layer 254. The first lamination layer 254 is typically a thin layer of dielectric material, e.g., a 50 to 200 Angstrom layer of Al$_2$O$_3$ deposited by sputter deposition, ion beam deposition, or atomic layer deposition techniques. These thicknesses, are not limiting of the invention, but have proven useful for achieving a relatively pinhole free film to minimize eddy current loss while still being sufficiently thin to maintain the magnetic coupling between the magnetic layers in the writer 200. While not required to practice the invention, a second lamination layer 256 of dielectric material is provided to further control eddy current in the writer 204. The second pole 250 has a substantially flat top pole layer 258 that is formed in one embodiment of NiFe, CoNiFe, high moment alloys, sputtered high moment materials, or combinations thereof and in another embodiment of a hybrid of electroplated material along with a sputtered flux enhancement layer.

The design of writer 204 provides a number of advantages over other writer configurations. The inclusion in the top pole 250 of lamination layer 254 (and, optionally, layer 256) reduces eddy current at high operating frequencies. In preferred embodiments of the writer 204, each magnetic layer of the top pole 250 is relatively thin (e.g., less than 1 micrometer) to reduce eddy current loss but the relatively large total thickness of the top pole 250 (i.e., in one embodiment, greater than 2 microns) improves the likelihood of achieving high head efficiency. The top pole 250 includes a bottom shaper 252 of high moment material to reduce the inefficiency of the writer 204. The bottom shaper 252 and upper layer 238 of the write gap pedestal 234 (along with insulation insert 240) are coplanar (defining plane 264) which improves the control of fabrication processes and are typically fabricated in the same process steps and of the same materials to simplify fabrication of the writer 204.

With an understanding of the structure of the writer 204 and read/write head 200 of the invention, an exemplary method of fabricating a writer, such as writer 204, will be presented with reference to FIGS. 4A–4E. In forming a read/write head, such as head 200, the read portion 202 can be constructed according any of a number of useful methods known in the background art. In forming a writer with reference to FIG. 4A, such as writer 204 in FIG. 2, the wafer processes include patterning and plating of the first pole 218 (P1) and the first pole 218 (P1, and in some embodiment the second shield S2 of the read element) can then be planerized along with a first midcoat (such as a midcoat of alumina (Al$_2$O$_3$)). The first insulation 220 for the coil 222 is then deposited on the first pole 218. Standard coil fabrication processes (such as depositing a coil seed layer, producing a patterned photoresist mask for defining the coils 222, plating the coils 222, and removing the photoresist) are then performed to provide the coils 222 on insulation layer 220. The coils 222 are then covered with photoresist insulation 224 that is then cured.

The write gap pedestal 234 (and concurrently, back gap pedestal 230) is then fabricated, typically using photolithography and plating. In an optional process step, the coil insulation 224 can be partially removed with oxygen RIE or other techniques to minimize the amount of photoresist in the head 200, thereby reducing pole tip protrusion. The second midcoat is deposited to form insulation layer 228. Chemical mechanical polishing or other processes are then performed to planarize the top surface of layer 228 and write gap pedestal 234 (and pedestal 230 not shown) as indicated by plane 260 and to expose and construct (i.e., define the height and shape of) the pedestal 234 with extremely high precision to provide a planar surface, which is desired for fabrication of a narrow track width for the writer. If appropriate or desired, a thin coil insulation layer (part of layer 228) is now deposited to further electrically and/or magnetically isolate the coils 222 from the top pole 250 (shown in FIG. 2).

Referring again to FIG. 4A, once these preliminary writer fabrication steps are completed, the processes unique to this writer fabrication method are begun with the deposition of a hot seed layer 402 on the plane 260, i.e., on the planar top surfaces of the insulation layer 228 and write gap pedestal 234. In one embodiment, this step involves sputter depositing high B$_S$ materials as a monolithic or laminated material. The materials used for the hot seed layer 402 may be an of a number of high moment materials, such as FeN, FeCoN, and FeCoNi alloys or FeXN or FeCoXN with X being Rh, Ta, Al, Ir, Zr, and the like. In some preferred embodiments, layer 402 comprises films in the thickness range of about 0.1 to 0.5 micrometer, which, in turn, results in bottom shaper and upper layer of write gap pedestal having substantially equivalent thicknesses in this same range.

Figure 4A:
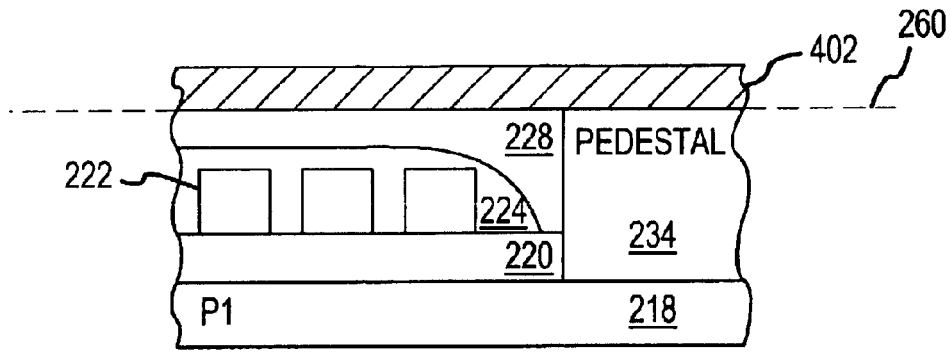
FIGS. 4A–4E are simplified sectional views of a read/write head, such as the head of FIGS. 2 and 3, illustrating fabrication processes useful for forming the flat top pole of the invention.
Figure 4B:
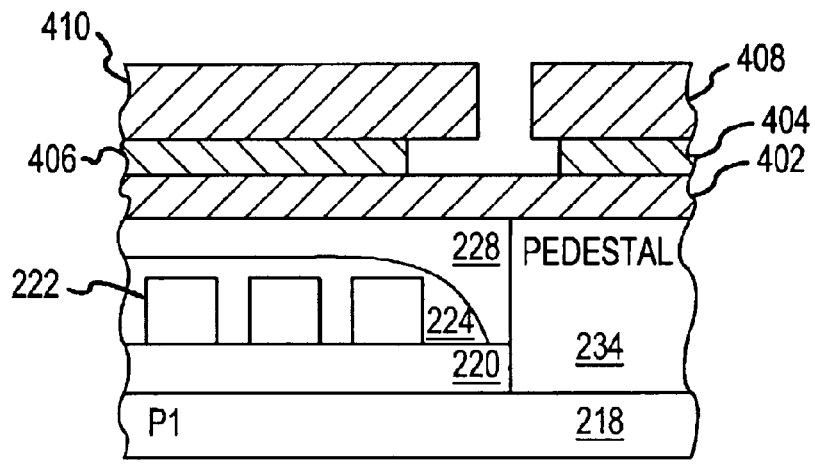
Figure 4C:
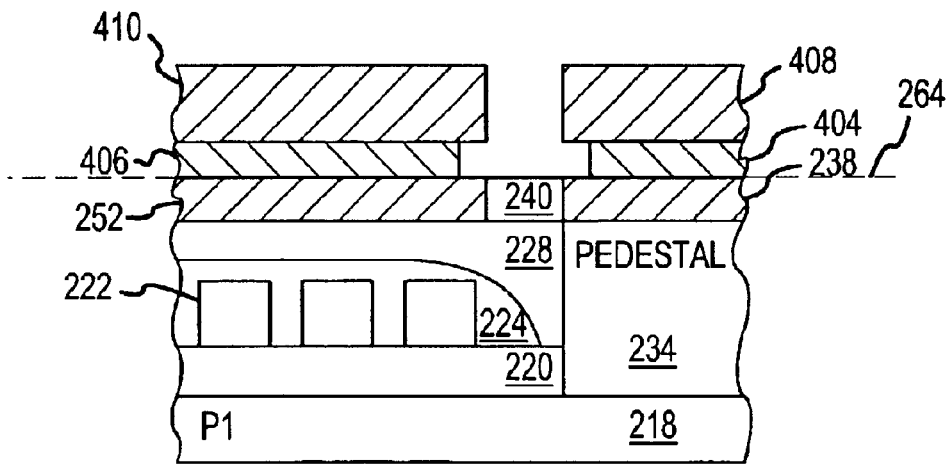

FIG. 4B illustrates the next steps of the writer fabrication process in which the photoresist pattern for the pedestal 234 and more specifically, pedestal top layer 238 and for the bottom shaper 252 is defined. While a single layer of photoresist may be used to form these components 238, 252, the illustrated process involves using a bi-layer photoresist pattern to form the underlying pedestal layer 238 and bottom shaper 252. In this embodiment, a layer of polymethylglutarimide (PMGI) or other material is provided that is relatively easy to dissolve in developer agents. A layer of photoresist is spun onto the PMGI portions 404, 406 and is patterned into a pedestal portion 408 and a bottom shaper portion 410 with an overhang portion over portions 404, 406. In FIG. 4C illustrates the next fabrication steps of ion milling or other material removal processes to remove an interior portion of the hot seed layer 402 in the unprotected area to form the bottom shaper 252 and upper pedestal layer 238. This formed gap between these components 238, 252 is then filled by the deposition of electrical and/or magnetic insulation material (such as Al$_2$O$_3$) as insulation insert 240 at the zero throat location. A plane 264 is now defined by the upper surfaces of the bottom shaper 252, the insert 240, and the upper pedestal layer 238.

Figure 4D:
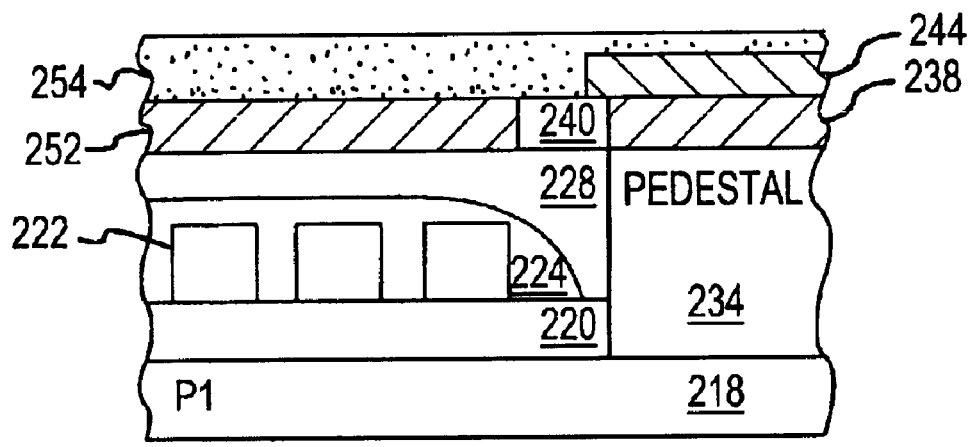

Referring to FIGS. 4C and 4D, a lift-off process is next performed to remove the photoresist portions 408, 410 and the PMGI or insulation layers 404, 406. Next, a write gap layer 244 of nonmagnetic metal or dielectric material is deposited on the upper layer 238 of the pedestal 234 and insert 240, such as by using a lift-off process. The first lamination layer 254 useful for controlling eddy current is then formed by depositing (such as with sputtering, ion beam deposition, or atomic layer deposition (ALD)) a thin layer of dielectric material or magnetic lamination materials. In one embodiment, the layer 254 is formed by of Al$_2$O$_3$ having a thickness selected from the range of about 50 to 200 Angstroms.

Figure 4E:
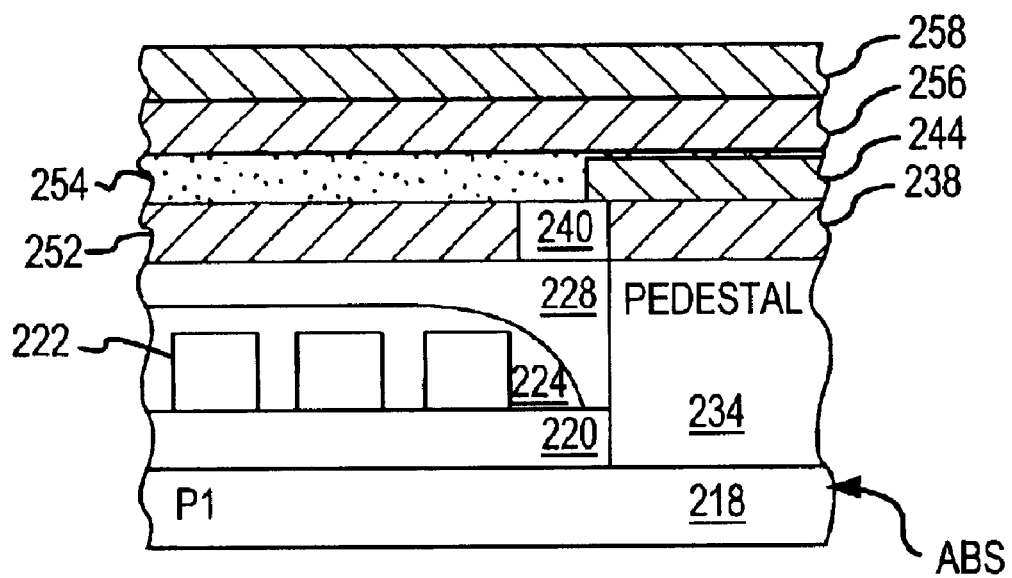

In FIG. 4E, a second lamination layer 256 is formed such as by sputter deposition or other techniques. This layer 256 is optional but is useful in some embodiments to provide additional control of eddy current. Another optional processing step may be performed at this point in the writer fabrication that involves plating of NiFe, CoNiFe, or other material for the upper or top pole layer 258 of the second or top pole 250. The top pole layer 258 is then formed, and because the layer 258 is fabricated onto a planarized surface, advanced photolithography (such as DUV lithography), can be employed for effectively controlling critical dimensions. The final fabrication steps may include performing photolithography of upper layer 258 and frame electroplating.

These steps are then followed by photoresist removal, seed removal by ion milling or other techniques, and pole tip trimming to achieve a desired track width and a notch (not shown) in the first pole 218. Generally, extensive ion milling is used to mill through the sputtered high moment layer and the seed. In some cases, another photolithography and wet etching is used to remove the plating field. To trim the pole tip, ion milling is used to trim the pole tip to a desired geometry and shape. In order to create a notched structure in the pedestal 234, the write gap 244 is often removed first with another milling step being then used to form the notch (if desired).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the specific materials and thicknesses of the layers described above can be varied significantly to practice the invention as will be readily appreciated by those skilled in the art. The described writers and read/write heads utilized a relatively thick, flat top pole for increased writer efficiency and protected against large eddy current loss with the use of one or more laminated layers. In some embodiments, a flat top pole design with a relatively thin top or second pole may be used to limit eddy current loss while including the high moment bottom shaper and upper layer on the write gap pedestal to decrease inefficiencies, and while not shown, such embodiments are considered within the breadth of the disclosure.

We claim:

1. A writer for use in a high frequency data recording head assembly, comprising:
   a first magnetic pole having a front portion and an opposite back portion;
   a write gap pedestal disposed above the front portion of the first pole and having an upper pedestal layer comprising a high magnetic moment material and including an upper surface substantially defining a plane;
   a write gap layer deposited on the upper surface of the upper pedestal layer;
   a second magnetic pole disposed above the first magnetic pole and including a top pole layer with a substantially planar upper surface and a bottom shaper disposed between the top pole layer and the first magnetic pole, wherein the bottom shaper comprises a high magnetic moment material and includes an upper surface that is substantially coplanar with the plane defined by the upper surface of the upper pedestal layer; and
   an electrically conducting coil disposed between the first and the second magnetic pole.

2. The writer of claim 1, wherein the high magnetic moment materials of the upper pedestal layer and the bottom shaper have a magnetic flux density, $B_S$, of at least about 20 kG.

3. The writer of claim 1, wherein the upper pedestal layer and the bottom shaper are formed in concurrent fabrication processes of substantially similar high magnetic moment films having a thickness selected the range of about 0.1 to about 0.5 micrometers.

4. The writer of claim 3, wherein the films comprise materials selected from the group consisting of FeN alloys, FeCoN alloys, FeCoNi alloys, or FeXN or FeCoXN alloys with X being Rh, Ta, Al, Ir, or Zr.

5. The writer of claim 1, further including an insert of electrical and magnetic insulation material disposed between the upper pedestal layer and the bottom shaper and wherein an upper surface of the insert is substantially coplanar with the upper surface of the bottom shaper.

6. The writer of claim 1, wherein the second magnetic pole further includes a lamination layer comprising material for disrupting eddy current positioned on an upper surface of the write gap layer and the upper surface of the bottom shaper.

7. The writer of claim 6, wherein the material of the lamination layer is a dielectric material and has a thickness of less than about 200 Angstroms.

8. The writer of claim 6, wherein the second magnetic pole further includes another lamination layer disposed between the lamination layer and the top pole layer and formed of a dielectric material.

9. A head for use in data recording, comprising:
   first and second magnetic poles each including an open end and an opposite closed end, the poles being joined together at the closed ends and opposing each other at the open ends, an interior space being defined between the poles and between the open ends and the closed ends, and wherein the second magnetic pole includes a top pole layer of magnetic material distal to the first pole and a lamination layer of electrical insulation material proximal to the first pole;
   a write gap pedestal disposed adjacent the open end of the first pole and the second pole and between the poles;
   a write gap comprising non-magnetic, electrically insulating material between the write gap pedestal and the lamination layer of the second pole;
   an electrically conducting coil having a portion thereof passing through the interior space; and
   an insulator disposed within the interior space and electrically isolating the coil from the second pole.

10. The head of claim 9, wherein the insulation material of the lamination layer is a dielectric material and has a thickness of less than about 200 Angstroms.

11. The head of claim 9, wherein the second magnetic pole further includes another lamination layer disposed between the lamination layer and the top pole layer and formed of a dielectric material.

12. The head of claim 9, wherein the write gap pedestal includes an upper pedestal layer comprising a high magnetic moment material and including a substantially planar upper surface upon which the write gap material layer is positioned.

13. The head of claim 12, wherein the second magnetic pole further includes a bottom shaper comprising the high magnetic moment material with an upper surface abutting the lamination layer and being substantially coplanar to the upper surface of the upper pedestal layer.

14. The head of claim 13, wherein the high magnetic moment material of the upper pedestal layer and the bottom shaper has a magnetic flux density, $B_S$, of at least about 20 kG.

15. The head of claim 13, wherein the upper pedestal layer and the bottom shaper are formed in concurrent fabrication processes of substantially similar high magnetic moment films having a thickness selected the range of about 0.1 to about 0.5 micrometers.

16. The head of claim 13, wherein the films comprise materials selected from the group consisting of FeN alloys, FeCoN alloys, FeCoNi alloys, or FeXN or FeCoXN alloys with X being Rh, Ta, Al, Ir, or Zr.

17. The head of claim 13, further including an insert of electrical and magnetic insulation material disposed between the upper pedestal layer and the bottom shaper, wherein an upper surface of the insert is substantially coplanar with the upper surface of the bottom shaper.

18. The head of claim 9, further including a shield layer disposed below the first magnetic pole, a dielectric layer disposed between the shield layer and the first magnetic pole, and a read sensor embedded within the dielectric layer.

19. A system for storing and retrieving digital data to and from a magnetic recording media, comprising:
a head assembly positionable adjacent the magnetic recording media comprising:
a read head; and
a write head comprising:
a first magnetic pole having a front portion and an opposite back portion;
a write gap pedestal disposed above the front portion of the first pole and having an upper pedestal layer comprising a high magnetic moment material and including an upper surface substantially defining a plane;
a write gap layer deposited on the upper surface of the upper pedestal layer;
a second magnetic pole disposed above the first magnetic pole and including a top pole layer with a substantially planar upper surface and a bottom shaper disposed between the top pole layer and the first magnetic pole, wherein the bottom shaper comprises a high magnetic moment material and includes an upper surface that is substantially coplanar with the plane defined by the upper surface of the upper pedestal layer; and
an electrically conducting coil disposed between the first and the second magnetic pole; and
a drive device for coupling to the media so as to move the media with respect to the head assembly.

20. The system of claim 19, wherein the upper pedestal layer and the bottom shaper are formed in concurrent fabrication processes of substantially similar high magnetic moment films having a thickness selected the range of about 0.1 to about 0.5 micrometers.

21. The system of claim 20, wherein the films comprise materials selected from the group consisting of FeN alloys, FeCoN alloys, FeCoNi alloys, or FeXN or FeCoXN alloys with X being Rh, Ta, Al, Ir, or Zr.

22. The system of claim 19, further including an insert of electrical and magnetic insulation material disposed between the upper pedestal layer and the bottom shaper, wherein an upper surface of the insert is substantially coplanar with the upper surface of the bottom shaper.

23. The system of claim 19, wherein the second magnetic pole further includes a lamination layer comprising material for disrupting eddy current positioned on an upper surface of the write gap layer and the upper surface of the bottom shaper.

24. The system of claim 23, wherein the material of the lamination layer is a dielectric material and has a thickness of less than about 200 Angstroms.

25. A method of fabricating a thin film write head, comprising:
providing a first magnetic pole upon which an electrically conducting coil with insulation materials and a pedestal has been deposited, wherein the insulation materials and pedestal have been planarized to provide a substantially continuous, coplanar upper surface;
depositing a film of high magnetic moment material on the upper surface of the coil insulation materials and pedestal;
positioning photoresist over the deposited film in a pattern configured to define by shielding a bottom shaper and an upper pedestal layer in the film and by leaving a gap portion between the bottom shaper and upper pedestal layer unshielded;
removing the film material in the gap portion;
filling the gap portion with electrical and magnetic insulation material to form an insulation insert between the bottom shaper and the upper pedestal layer, wherein the insulation insert, the bottom shaper, and the upper pedestal layer have substantially coplanar upper surfaces;
depositing a layer of write gap material on the upper surface of the upper pedestal layer and at least a portion of the insulation insert; and
forming a second magnetic pole over the bottom shaper, the insulation insert, and layer of write gap material.

26. The method of claim 25, wherein the film material has a magnetic flux density of at least about 20 kG and a thickness of less than about 0.5 micrometers.

27. The method of claim 25, wherein the film material comprises a material selected from the group consisting of FeN alloys, FeCoN alloys, FeCoNi alloys, or FeXN or FeCoXN alloys with X being Rh, Ta, Al, Ir, or Zr.

28. The method of claim 25, wherein the second magnetic pole includes a substantially planar top pole layer distal to the bottom shaper comprising magnetic material and a thin dielectric lamination layer between the top pole layer and the bottom shaper.

29. The method of claim 28, wherein the lamination member has a thickness in the range of about 50 to about 200 Angstroms.

30. The method of claim 28, wherein the second magnetic pole further includes another layer of dielectric material between the top pole layer and the thin dielectric lamination layer.

* * * * *